US012779853B2

(12) United States Patent
Morita et al.

(10) Patent No.: US 12,779,853 B2
(45) Date of Patent: Nov. 3, 2026

(54) MAINTENANCE DEVICE AND INKJET RECORDING APPARATUS

(71) Applicant: KYOCERA Document Solutions Inc., Osaka (JP)

(72) Inventors: Takashi Morita, Osaka (JP); Tatsuhiko Yoshii, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 119 days.

(21) Appl. No.: 19/048,813

(22) Filed: Feb. 7, 2025

(65) Prior Publication Data

US 2025/0262858 A1 Aug. 21, 2025

(30) Foreign Application Priority Data

Feb. 20, 2024 (JP) ................................ 2024-024023

(51) Int. Cl.
*B41J 2/165* (2006.01)

(52) U.S. Cl.
CPC ................................ *B41J 2/16511* (2013.01)

(58) Field of Classification Search
CPC ................ B41J 2/16508; B41J 2/16511; B41J 2/16538; B41J 2/16552; B41J 2/16585; B41J 2/1721
See application file for complete search history.

(56) References Cited

U.S. PATENT DOCUMENTS 10,259,225 B2 4/2019 Araki et al.
2007/0195122 A1* 8/2007 Hiruma ................ B41J 2/16552 347/29
2009/0092761 A1* 4/2009 Ishida ............... G02F 1/133711 445/60
2013/0250000 A1* 9/2013 Yamamoto ........... B41J 2/16538 347/33
2018/0194141 A1 7/2018 Araki et al.
2022/0212472 A1* 7/2022 Hoang ................. B41J 2/16508

FOREIGN PATENT DOCUMENTS

JP 2002-019132 A 1/2002
JP 2018-108711 A 7/2018

* cited by examiner

*Primary Examiner* — Anh T Vo
(74) *Attorney, Agent, or Firm* — Studebaker Brackett PLLC

(57) ABSTRACT

A maintenance device includes a cap, a lifting device, a cleaning liquid supply device, an oscillating device, and a control part. The cap is attached to a nozzle surface of an inkjet head. The lifting device lifts and lowers at least one of the inkjet head or the cap. The cleaning liquid supply device supplies a cleaning liquid to the cap. The oscillating device oscillates the cap. The cap has a base portion, a wall portion which surrounds the nozzle surface, and an elastic body which has a liquid absorbency and is placed on a region inside the wall portion on the base portion. The control part controls the cleaning liquid supply device to supply the cleaning liquid to the cap, controls the lifting device such that the elastic body is pressed on the nozzle surface, and then controls the oscillating device to oscillate the cap.

6 Claims, 9 Drawing Sheets

MAINTENANCE DEVICE AND INKJET RECORDING APPARATUS

INCORPORATION BY REFERENCE

This application is based on and claims the benefit of priority from Japanese patent application No. 2024-024023 filed on Feb. 20, 2024, which is incorporated by reference in its entirety.

BACKGROUND

The present disclosure relates to a maintenance device and an inkjet recording apparatus.

In the inkjet recording apparatus, there is a possibility that ink remains on or sticks to a nozzle surface of an inkjet head, causing ejection failure. Therefore, a technique for cleaning the nozzle surface has been studied. For example, there is a configuration in which a wiper scrapes a cleaning liquid from a cleaning liquid supply port adjacent to the nozzle surface, and the wiper holding the cleaning liquid slides along the nozzle surface. Further, a spray nozzle sprays the cleaning liquid onto the nozzle surface, and the wiper wipes the nozzle surface.

However, in the former configuration, since the wiper has a low capacity to hold the cleaning liquid, an amount of the cleaning liquid supplied to the nozzle surface is insufficient. In the latter configuration, there is a possibility that the cleaning liquid is scattered and the inside of the apparatus main body is contaminated.

SUMMARY

A maintenance device according to the present disclosure includes a cap, a lifting device, a cleaning liquid supply device, an oscillating device, and a control part. The cap is attached to a nozzle surface of an inkjet head. The lifting device lifts and lowers at least one of the inkjet head or the cap. The cleaning liquid supply device supplies a cleaning liquid to the cap. The oscillating device oscillates the cap. The control part controls the lifting device, the cleaning liquid supply device and the oscillating device. The cap has a base portion, a wall portion which protrudes upward from an upper surface of the base portion and surrounds the nozzle surface, and an elastic body which has a liquid absorbency and is placed on a region inside the wall portion on the base portion. The control part controls the cleaning liquid supply device to supply the cleaning liquid to the cap, controls the lifting device such that the elastic body is pressed on the nozzle surface, and then controls the oscillating device to oscillate the cap.

An inkjet recording apparatus according to the present disclosure includes the inkjet head, and the maintenance device.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the attached drawings, an inkjet recording apparatus 1 according to one embodiment of the present disclosure will be described below.

Figure 1:
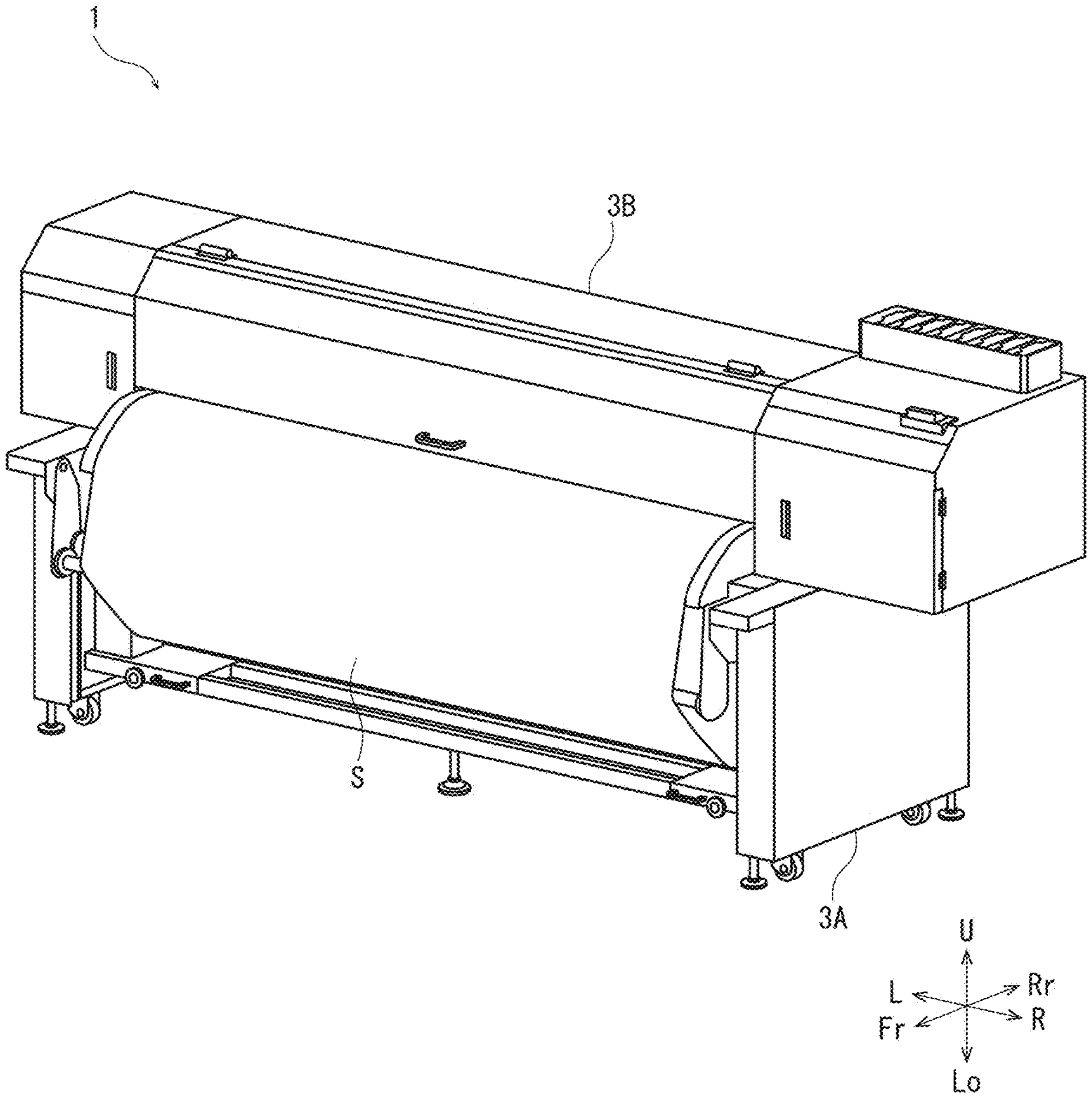
FIG. 1 is a perspective view showing an external appearance of an inkjet recording apparatus according to one embodiment of the present disclosure.
Figure 2:
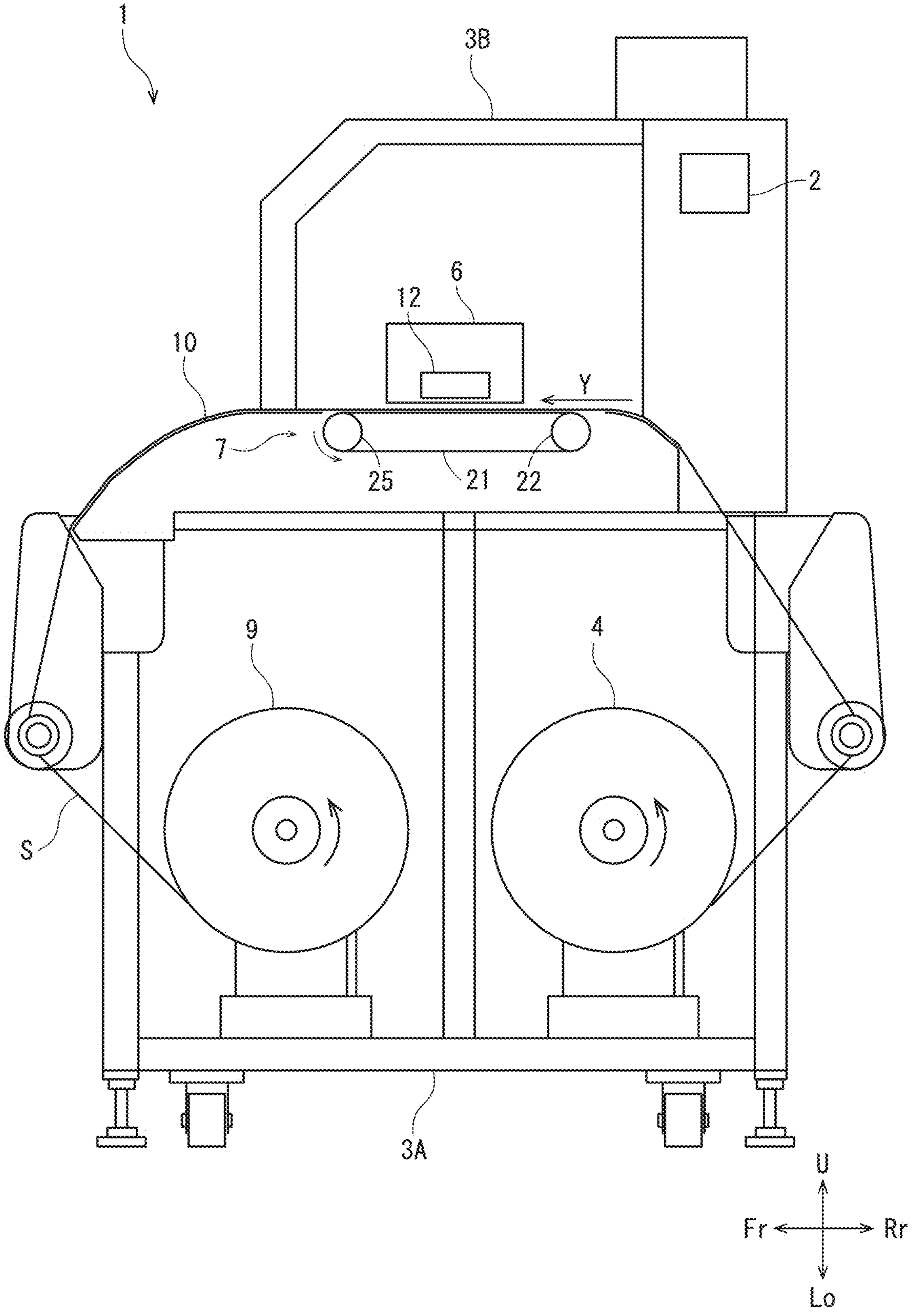
FIG. 2 is a side view schematically showing an internal structure of the inkjet recording apparatus according to the embodiment of the present disclosure.
Figure 3:
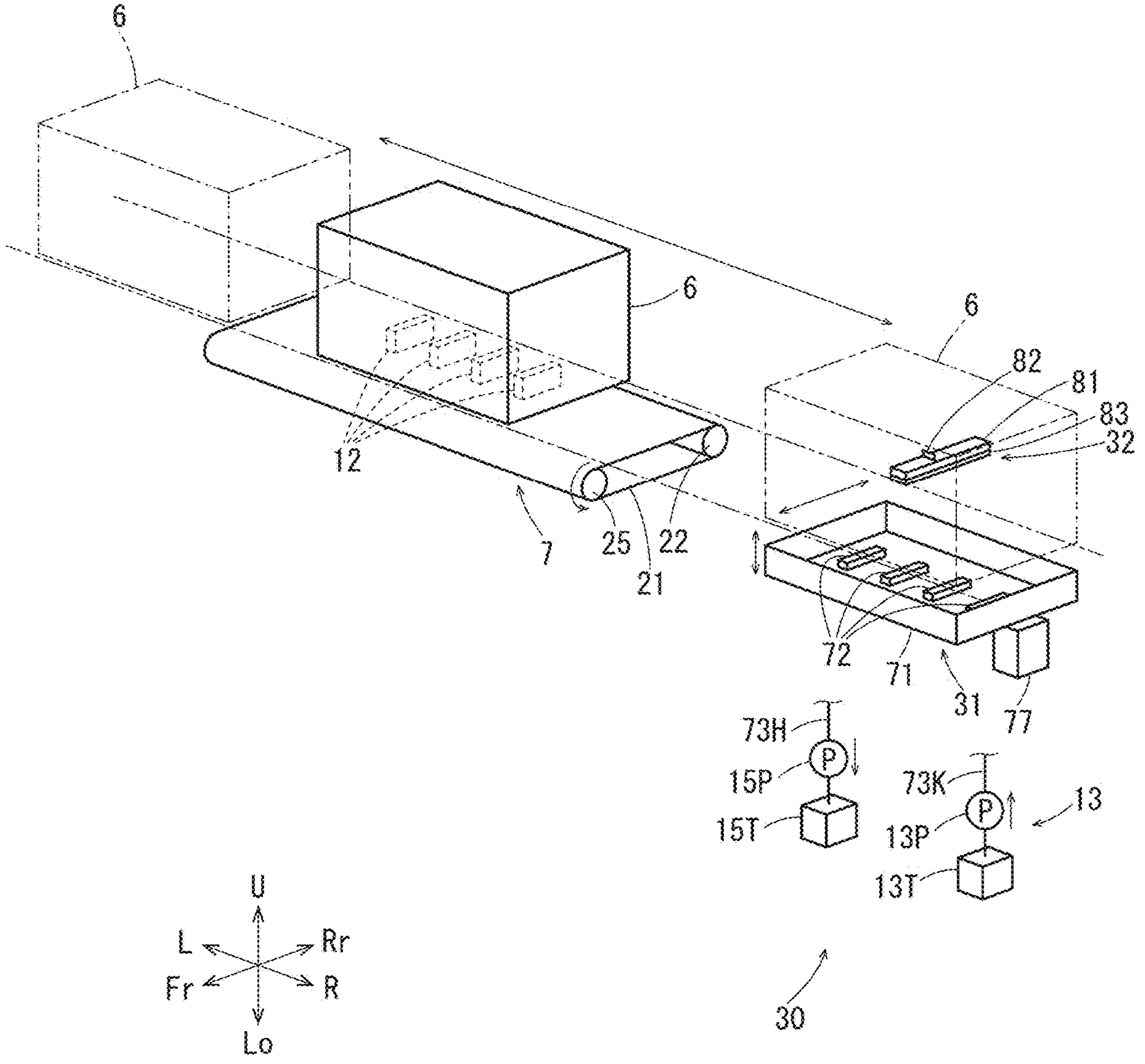
FIG. 3 is a perspective view schematically showing the internal structure of the inkjet recording apparatus according to the embodiment of the present disclosure.
Figure 4:
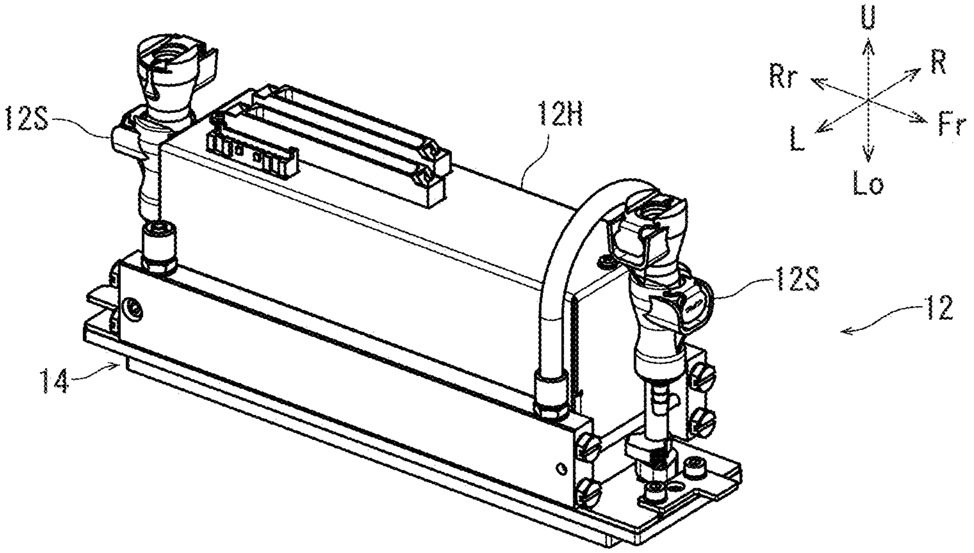
FIG. 4 is a perspective view showing an inkjet head according to the embodiment of the present disclosure.
Figure 5:
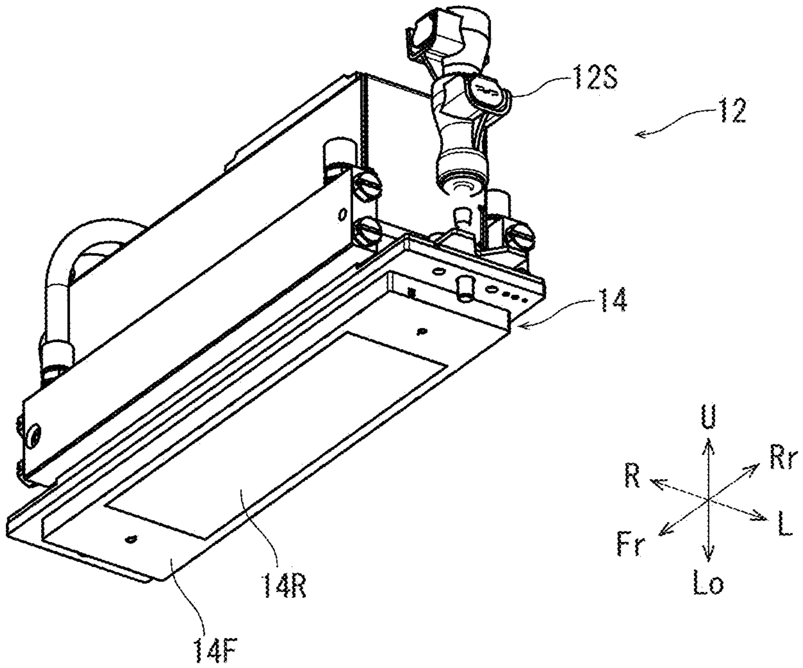
FIG. 5 is a perspective view showing the inkjet head according to the embodiment of the present disclosure.
Figure 6:
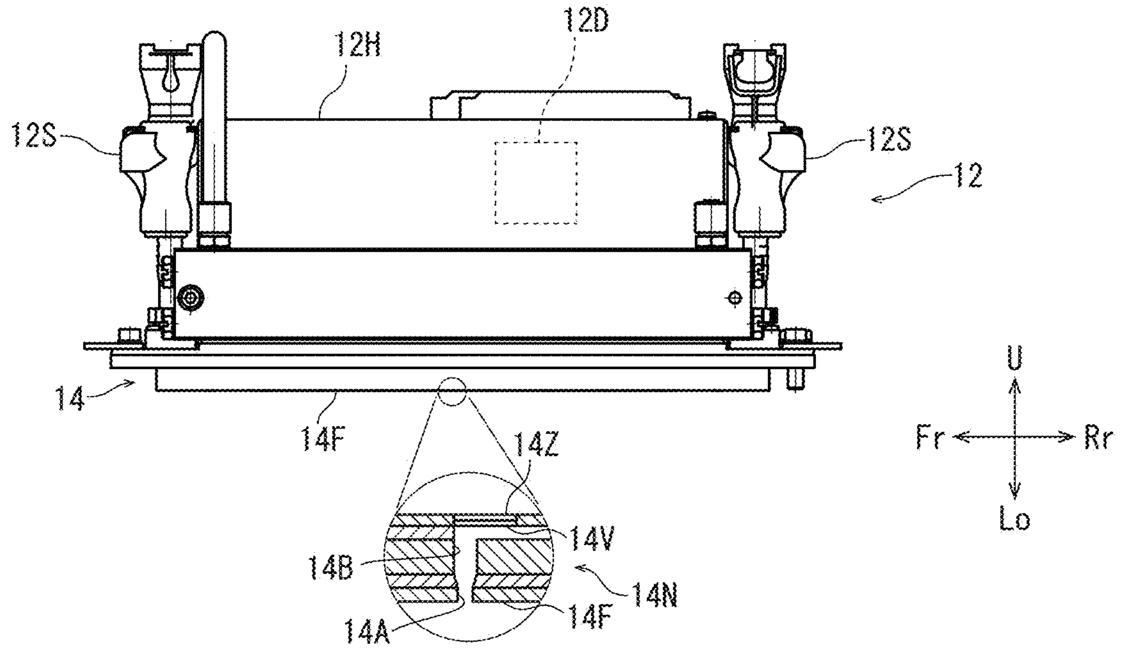
FIG. 6 is a right side view showing the inkjet head according to the embodiment of the present disclosure.
Figure 7:
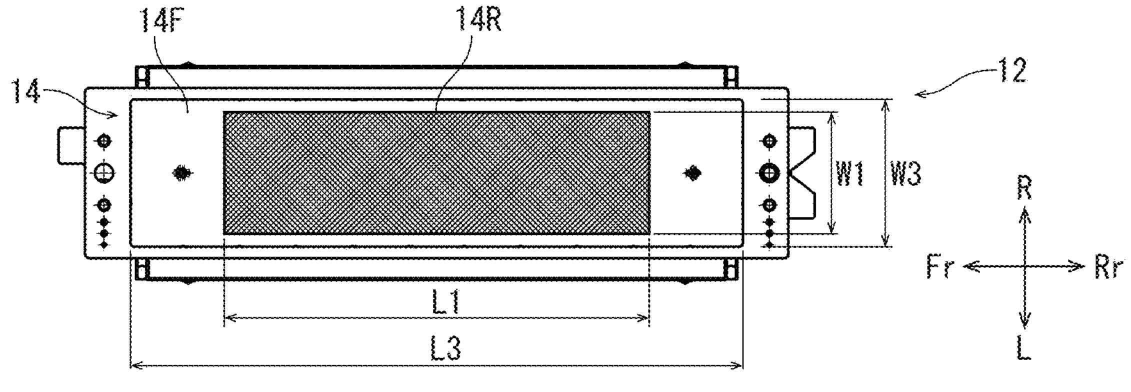
FIG. 7 is a bottom view showing the inkjet according to the embodiment of the present disclosure.
Figure 8:
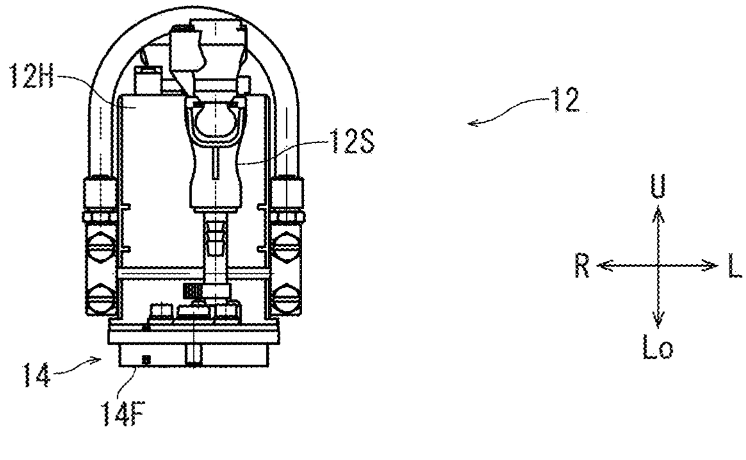
FIG. 8 is a rear view showing the inkjet head according to the embodiment of the present disclosure.

FIG. 1 is a perspective view showing an external appearance of the inkjet recording apparatus 1. FIG. 2 is a side view schematically showing an internal structure of the inkjet recording apparatus 1. FIG. 3 is a perspective view schematically showing the internal structure of the inkjet recording apparatus 1. FIG. 4 and FIG. 5 are perspective views showing an inkjet head 12. FIG. 6 is a right side view showing the inkjet head 12. FIG. 7 is a bottom view showing the inkjet head 12. FIG. 8 is a rear view showing the inkjet head 12. Hereinafter, the left side of the paper plan on which FIG. 2 is drawn is defined as the front side of the inkjet recording apparatus 1, and the right-and-left directions will be described with reference to the direction in which the inkjet recording apparatus 1 is viewed from the front side. In each figure, U, Lo, L, R, Fr, and Rr indicate the upper, lower, left, right, front, and rear, respectively.

The inkjet recording apparatus 1 (see FIG. 1 and FIG. 2) includes a lower housing 3A and an upper housing 3B provided above the lower housing 3A. Inside the lower housing 3A, a feed roll 4, a rewind roll 9 provided in front of the feed roll 4, a conveying unit 7 provided above the feed roll 4 and the rewind roll 9, and a conveyance path 10 extending from the feed roll 4 to the rewind roll 9 via the conveying unit 7 are provided. One end of a sheet S is wound around the feed roll 4, and the other end of the sheet S is wound around the rewind roll 9. The sheet S is made of paper, resin film, cloth or the like. The conveying unit 7 includes a driving roller 25, a driven roller 22 arranged on the rear side of the driving roller 25 parallel to the driving roller 25, and an endless belt 21 wound around the driving roller 25 and the driven roller 22.

Inside the upper housing 3B, an image forming unit 6 and a maintenance device 30 are provided. The image forming unit 6 includes a plurality of (in this embodiment, four) inkjet heads 12 facing the conveying unit 7. The image forming unit 6 ejects ink to the sheet S on the conveying unit 7 while reciprocating in the left-and-right directions by a driving device (not shown). The maintenance device 30 will be described later.

The inkjet head 12 (see FIG. 6) includes a rectangular parallelepiped housing 12H whose longitudinal direction is along the front-and-rear direction, nozzle plate 14 whose longitudinal direction is along the front-and-rear direction and provided at the bottom of the housing 12H, and a socket 12S to which a pipe for supplying the ink is connected. The nozzle plate 14 has a large number of nozzles 14N arranged in the front-and-rear direction. The nozzle 14N has a branch flow pass 14B branched from the downstream side of the socket 12S and a plurality of ejection ports 14A provided on a nozzle surface 14F which is a lower surface of the nozzle plate 14. The ejection ports 14A are provided in a rectangular region (referred to as an ejectable region 14R) of the nozzle surface 14F excluding the front and rear end portions and the left and right end portions. A diaphragm 14V also serves as a part of the inner wall of the branch flow pass 14B. The diaphragm 14V is provided with a pressurizing element 14Z. As the pressurizing element 14Z, a piezoelectric element, an electrostatic actuator, a heater, and the like are used. A driving circuit 12D for driving the pressurizing element 14Z is connected to the pressurizing element 14Z.

The control part 2 (see FIG. 2) includes an arithmetic part and a storage part (not shown). The arithmetic part is, for example, a CPU (Central Processing Unit). The storage part includes a storage medium such as ROM (Read Only Memory), RAM (Random Access Memory), and EEPROM (Electrically Erasable Programmable Read Only Memory). The arithmetic part reads and executes control program stored in the storage part to perform various processes. The control part 2 may be implemented by an integrated circuit that does not use software.

The basic image forming operation of the inkjet recording apparatus 1 is as follows. When an image forming job is input to the inkjet recording apparatus 1 from an external computer or the like, the control part 2 drives the feed roll 4, the conveying unit 7, and the rewind roll 9 in the counterclockwise direction in FIG. 2, and the sheet S is conveyed in the Y direction along the conveyance path 10. When the control part 2 supplies a drive signal corresponding to the image data to the driving circuit 12D in synchronization with the conveyance of the sheet S, the driving circuit 12D supplies an ejection signal corresponding to the gradation of the image data to the pressurizing element 14Z, and the ink is ejected from the nozzle 14N.

[Maintenance Device] The maintenance device 30 (see FIG. 3) includes a cap unit 31 and a wipe unit 32. The maintenance device 30 is provided at the right end portion of the upper housing 3B. Although only one wipe unit 32 is shown in FIG. 3, actually, the same number of the wipe units 32 as the inkjet head 12 are arranged at the same interval as the inkjet head 12.

[Wipe Unit] The wipe unit 32 includes a frame body 81 and a blade 82 provided on the upper surface of the frame body 81. The maintenance device 30 is provided with a sliding device 83 for sliding the wipe unit 32 in the front-and-rear direction (the longitudinal direction of the nozzle surface 14F).

[Cap Unit] The cap unit 31 includes a rectangular parallelepiped frame body 71. A portion of the frame body 71 corresponding to the upper surface of the rectangular parallelepiped is open. The frame body 71 is provided with the same number of caps 72 as the inkjet heads 12 in the same arrangement as the inkjet heads 12 in the image forming unit 6. The maintenance device 30 is provided with a lifting device 77 for lifting and lowering the cap unit 31. After the image forming unit 6 is moved above the cap unit 31, the cap unit 31 is lifted so that the cap 72 is attached on the nozzle surface 14F. The lifting device 77 may be provided in the image forming unit 6.

Figure 9:
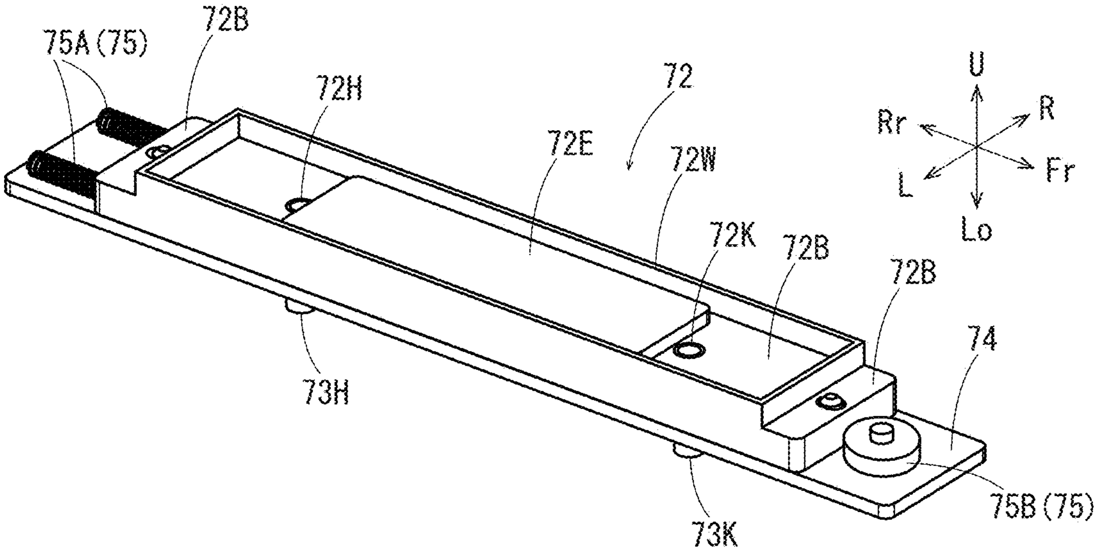
FIG. 9 is a perspective view showing a cap according to the embodiment of the present disclosure.
Figure 10:
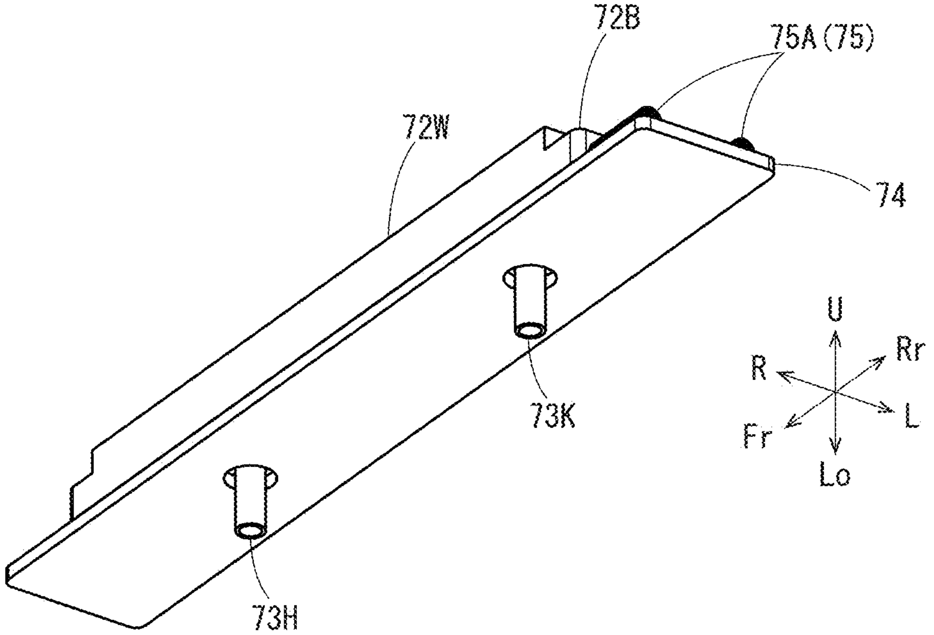
FIG. 10 is a perspective view showing the cap according to the embodiment of the present disclosure.
Figure 11:
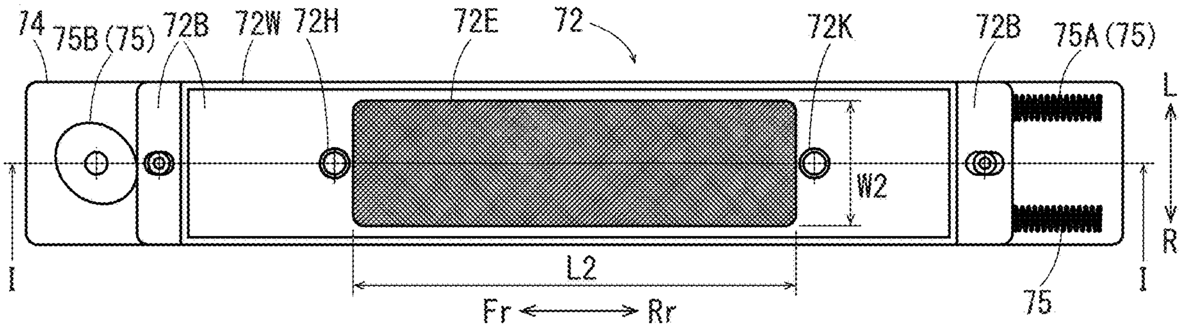
FIG. 11 is a plan view showing the cap according to the embodiment of the present disclosure.
Figure 12:
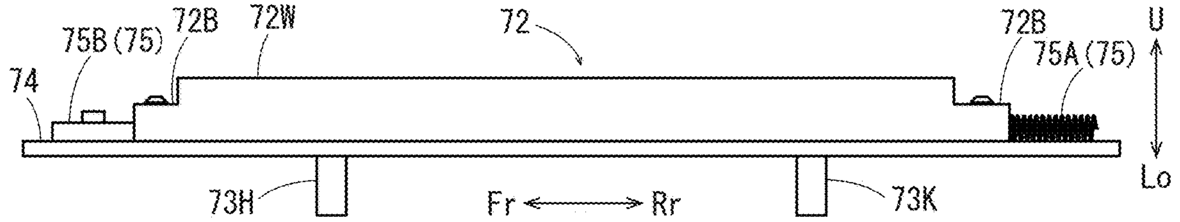
FIG. 12 is a right side view showing the cap according to the embodiment of the present disclosure.
Figure 13:
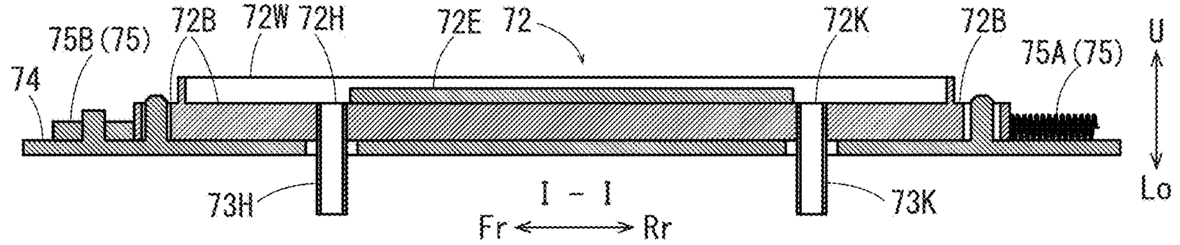
FIG. 13 is a cross-sectional view showing the cap according to the embodiment of the present disclosure.
Figure 14:
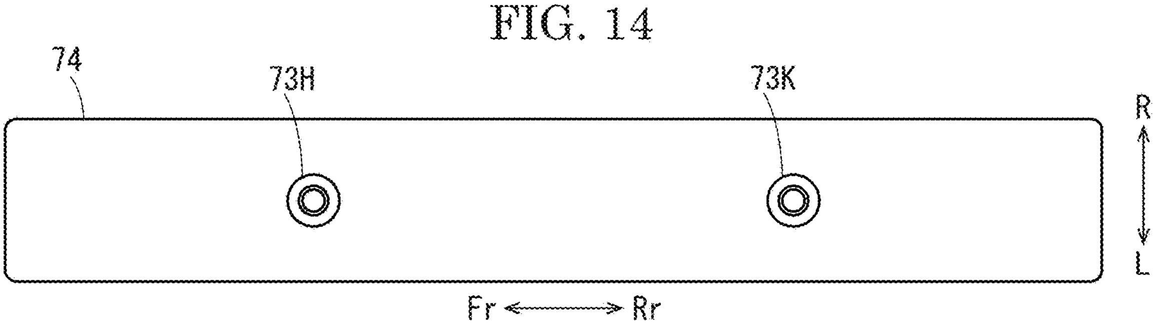
FIG. 14 is a bottom view showing the cap according to the embodiment of the present disclosure.
Figure 15:
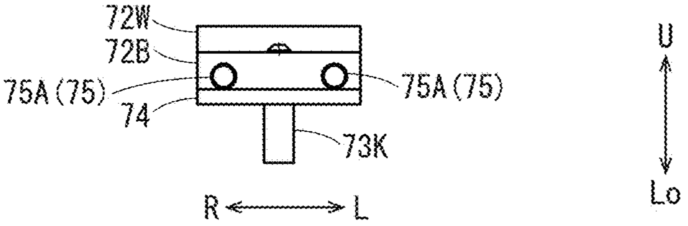
FIG. 15 is a rear view showing the cap according to the embodiment of the present disclosure.
Figure 16:
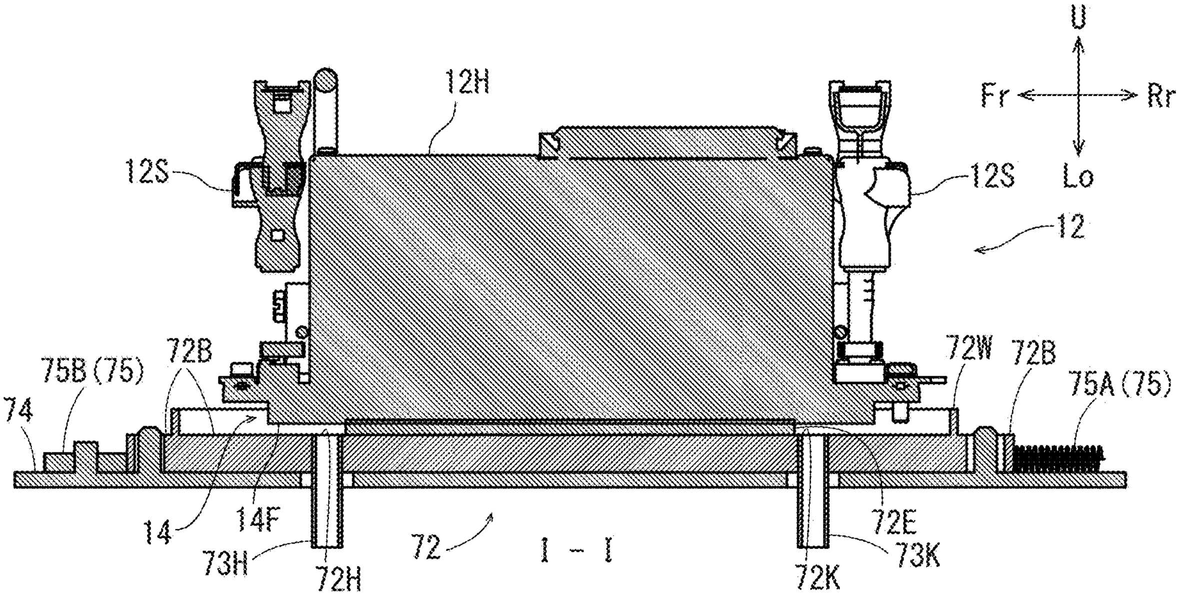
FIG. 16 is a cross-sectional view showing the inkjet head according to the embodiment of the present disclosure, to which the cap is attached.
Figure 17:
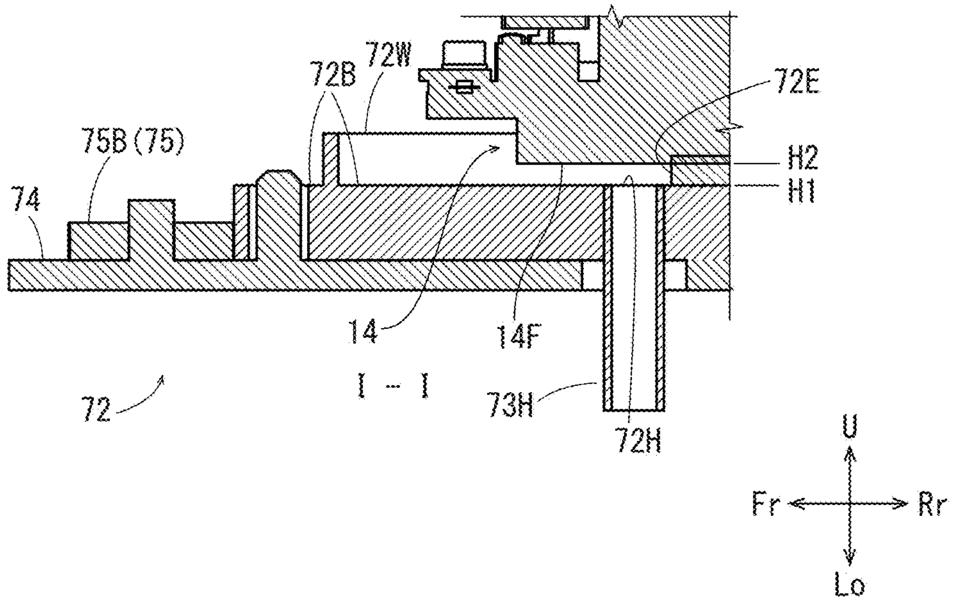
FIG. 17 is an enlarged view showing the lower front side portion of FIG. 16.

[Cap] FIG. 9 and FIG. 10 are perspective views showing the cap 72. FIG. 11 is a plan view showing the cap 72. FIG. 12 is a right side view showing the cap 72. FIG. 13 is a cross-sectional view showing the cap 72. FIG. 14 is a bottom view showing the cap 72. FIG. 15 is a rear view showing the cap 72. FIG. 16 is a cross-sectional view showing the inkjet head 12 to which the cap 72 is attached. FIG. 17 is an enlarged view showing the lower front side portion of FIG. 16.

The cap 72 has a base portion 72B, a wall portion 72W, and an elastic body 72E. The base portion 72B is formed in a flat plate shape whose longitudinal direction is along the front-and-rear direction. The wall portion 72W projects upward from the upper surface of the base portion 72B. The space inside the wall portion 72W is a rectangle wider than the nozzle surface 14F in the front-and-rear direction and the left-and right directions when viewed from the upper side. In other words, the wall portion 72W has a size that can surround the entire circumference of the nozzle plate 14. The base portion 72B and the wall portion 72W are integrally formed of resin, metal, or the like.

The elastic body 72E is provided at the center portion in the front-and-rear direction and in the left-and-right direction on an upper surface of the base portion 72B and inside the wall portion 72W. The upper surface of the elastic body 72E is positioned lower than the upper end of the wall portion 72W and parallel to the nozzle surface 14F. As the material of the elastic body 72E, material having a low friction coefficient and a high liquid absorbency is desirable, and for example, sponge, cloth, urethane, pile fabric, and the like are used. A length L2 of the elastic body 72E in the front-and-rear direction (the longitudinal direction direction) is longer than a length L1 of the ejectable region 14R and shorter than a length L3 of the nozzle surface 14F. A width W2 of the elastic body 72E in the left-and-right direction (the direction crossing the longitudinal direction) is wider than a width W1 of the ejectable region 14R and narrower than a width W3 of the nozzle surface 14F. In other words, the elastic body 72E is larger than the ejectable region 14R and smaller than the nozzle surface 14F.

The base portion 72B has a supply hole 72K on the rear side of the elastic body 72E, and a discharge hole 72H in front of the elastic body 72E. A tank 13T for storing a cleaning liquid and a pump 13P for feeding the cleaning liquid to the cap 72 are connected to the supply hole 72K via a supply pipe 73K (see FIG. 3). A pump 15P for sucking a waste liquid containing the ink and the cleaning liquid from the cap 72 and a tank 15T for storing the waste liquid are connected to the discharge hole 72H via a discharge pipe 73H. A cleaning liquid supply device 13 controls a liquid surface height of the cleaning liquid to be higher than a height H1 of the bottom surface of the elastic body 72E and lower than a height H2 of the nozzle surface 14F.

The cap 72 is attached to the frame body 71 via a support plate 74. The support plate 74 is immovable with respect to the frame body 71. The cap 72 is movable in the front-and-rear direction with respect to the support plate 74. The support plate 74 is provided with an oscillating device 75. The oscillating device 75 includes a biasing member 75A (for example, a compression coil spring) and an eccentric cam 75B whose axial direction is along the upper-and-lower direction. The biasing member 75A is provided on the rear side of the base portion 72B, and biases the base portion 72B forward. The eccentric cam 75B is provided in front of the base portion 72B, and is in contact with the front end surface of the base portion 72B. When the eccentric cam 75B is rotationally driven by a motor or the like (not shown), the cap 72 oscillates in the front-and-rear direction. The oscillating device 75 may be a vibration motor or the like.

[Operation of Maintenance Device] Next, the operation of the maintenance device 30 will be described. Maintenance of the inkjet head 12 is performed at a predetermined timing. The predetermined timing may be, for example, after the end of one image forming job, after performing of a predetermined amount of image forming, or periodically. Before the start of the maintenance, the cap unit 31 is retracted downward and the wipe unit 32 is retracted rearward.

First, the control part 2 moves the image forming unit 6 above the cap unit 31. Next, the control part 2 controls the cleaning liquid supply device 13 to supply the cleaning liquid to the cap 72, and controls the lifting device 77 to lift the cap unit 31. Since the elastic body 72E absorbs the cleaning liquid because of its high liquid absorbency. As the cap unit 31 is lifted, the nozzle plate 14 is accommodated in the space inside the wall portion 72W, and the elastic body 72E is pressed against the nozzle surface 14F. The cleaning liquid is discharged from the elastic body 72E by pressing the elastic body 72E, and the cleaning liquid is supplied abundantly to the nozzle surface 14F. Since the nozzle plate 14 is surrounded by the wall portion 72W, scattering of the cleaning liquid is suppressed.

Next, the control part 2 drives the eccentric cam 75B to oscillate the cap 72 in the front-and-rear direction for a predetermined time. Since a friction coefficient of the elastic body 72E is low, it slides smoothly with respect to the nozzle surface 14F, and the cleaning liquid penetrates into the high-viscosity ink remaining on the nozzle surface 14F.

Next, the control part 2 lowers the cap unit 31, positions the image forming unit 6 so that all the inkjet heads 12 are respectively positioned in front of the wipe unit 32, slides the wipe units 32 by the sliding device 83, and wipes the waste liquid containing the ink and the cleaning liquid from the nozzle surface 14F.

Next, after retracting the wipe unit 32 rearward, the control part 2 moves the image forming unit 6 above the cap unit 31, lifts the cap unit 31, and waits until a new image forming job is input. Since the elastic body 72E is pressed on the nozzle surface 14F, the nozzle surface 14F is moisturized, and increase in viscosity of the ink in the nozzle 14N is suppressed.

The maintenance device 30 according to the present embodiment described above includes the inkjet heads 12; the caps 72 which are attached to the nozzle surfaces 14F of the inkjet heads 12; the lifting device 77 which lifts and lower at least one of the inkjet head 12 or the cap 72; the cleaning liquid supply device 13 which supplies the cleaning liquid to the caps 72; the oscillating device 75 which oscillates the cap 72; and the control part 2 which controls the lifting device 77, the cleaning liquid supply device 13 and the oscillating device 75. The cap 72 has the base portion 72B, the wall portion 72W which protrudes upward from the upper surface of the base portion 72B and surrounds the nozzle surface 14F, and the elastic body 72E which has a liquid absorbency and is placed on the region inside the wall portion 72W on the base portion 72B. The control part 2 controls the cleaning liquid supply device 13 to supply the cleaning liquid to the cap 72, controls the lifting device 77 such that the elastic body 72E is pressed on the nozzle surface 14F, and then controls the oscillating device 75 to oscillate the cap 72. According to the present embodiment, it becomes possible to supply the cleaning liquid to the nozzle surface 14F abundantly without scattering the cleaning liquid.

According to the maintenance device 30 according to the present embodiment, the elastic body 72E is larger than the ejectable region 14R where the ejection ports 14A are formed on the nozzle surface 14F and smaller than the nozzle surface 14F. According to the present embodiment, the cleaning liquid can be supplied to the ejectable region 14R without excess or deficiency. Further, abrasion of the elastic body 72E due to friction with the edge of the nozzle surface 14F can be prevented.

According to the maintenance device 30 according to the present embodiment, the control part 2 controls the cleaning liquid supply device 13 such that a liquid height of the cleaning liquid is higher than a height of the bottom surface of the elastic body 72E and lower than a height of the nozzle surface 14F. According to the present embodiment, the infiltration of the cleaning liquid into the inkjet head 12 can be suppressed.

According to the maintenance device according to the present embodiment, the wall portion 72W has a size capable of surrounding the entire circumference of the nozzle plate 14 having the nozzle surface 14F. According to the present embodiment, deterioration of the nozzle surface 14F due to friction with the wall portion 72W can be prevented.

The inkjet recording apparatus 1 according to the present embodiment includes the inkjet heads 12 and the maintenance device 30. According to the present embodiment, since ink ejection failure is suppressed, deterioration in image quality can be suppressed.

The above embodiments may be modified as follows.

Figure 18:
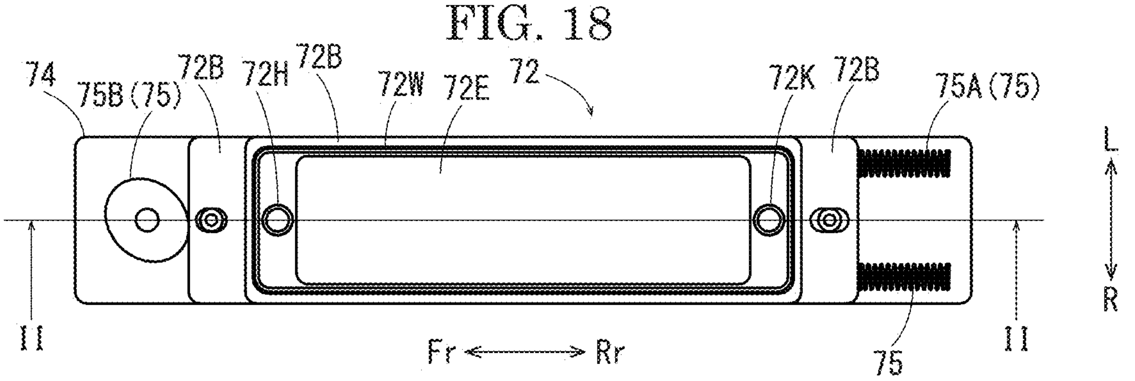
FIG. 18 is a plan view showing the cap according to a modified example of the embodiment of the present disclosure.
Figure 19:
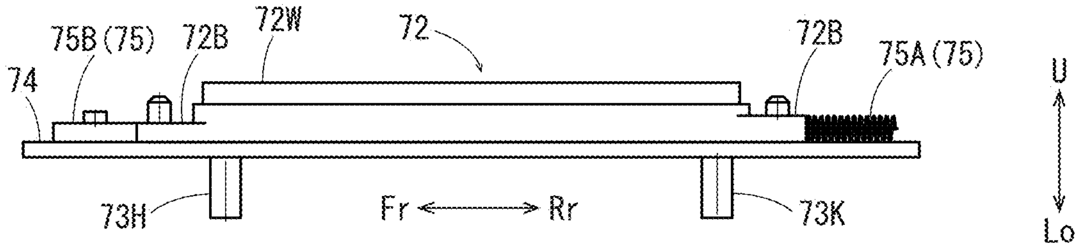
FIG. 19 is a right side view showing the cap according to the modified example of the embodiment of the present disclosure.
Figure 20:
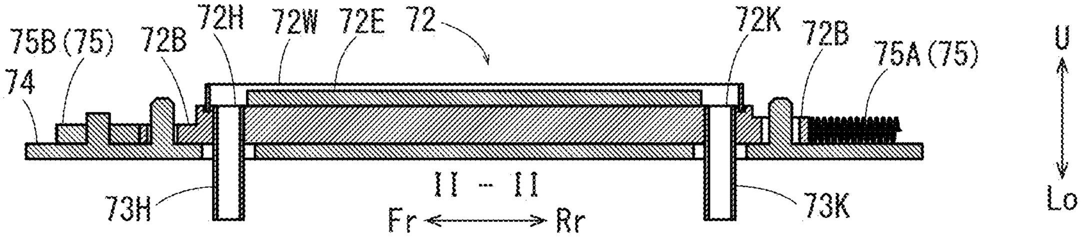
FIG. 20 is a cross-sectional view showing the cap according to the modified example of the embodiment of the present disclosure.
Figure 21:
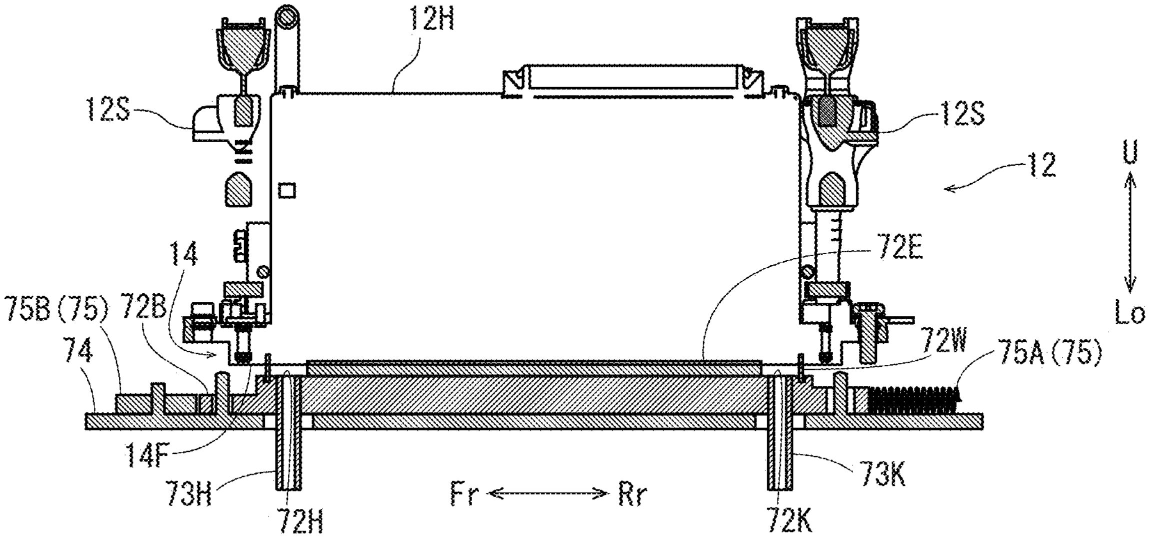
FIG. 21 is a cross-sectional view showing the inkjet head according to the modified example of the embodiment of the present disclosure, to which the cap is attached.

FIG. 18 is a plan view showing the cap 72. FIG. 19 is a right side view showing the cap 72. FIG. 20 is a cross-sectional view showing the cap 72. FIG. 21 is a cross-sectional view showing the inkjet head 12 to which the cap 72 is attached.

In this modified example, the structure of the wall portion 72W is different from that of the above-described embodiment. The space inside the wall portion 72W is a rectangle which is wider in the front and-rear direction and in the left-and-right direction than the ejectable region 14R and narrower in the front-and-rear direction and in the left-and-right direction than the nozzle surface 14F when viewed from the upper side. In other words, the wall portion 72W has a size that can surround the entire circumference of the ejectable region 14R of the nozzle surface 14F. The upper end of the wall portion 72W is positioned higher than the upper surface of the elastic body 72E and parallel to the nozzle surface 14F. As the material of the wall portion 72W, a material having a high friction coefficient, a low liquid absorbency, and a flexibility is desirable, for example, rubber, silicone rubber, and the like are used.

First, the control part 2 moves the image forming unit 6 above the cap unit 31. Next, the control part 2 supplies the cleaning liquid to the cap 72, and lifts the cap unit 31. The elastic body 72E absorbs the cleaning liquid because of its high liquid absorbency. Due to the lifting of the cap unit 31, the upper end of the wall portion 72W comes into contact with the nozzle surface 14F before the elastic body 72E. Subsequently, the wall portion 72W is bent, and the elastic body 72E is pressed on the nozzle surface 14F. The cleaning liquid is discharged from the elastic body 72E by the pressing the elastic body 72E, and the cleaning liquid is supplied abundantly to the nozzle surface 14F. Since the wall portion 72W is in contact with the nozzle surface 14F, scattering of the cleaning liquid is suppressed.

Next, the control part 2 drives the eccentric cam 75B to oscillate the cap 72 in the front-and-rear direction for a predetermined time. Since a friction coefficient of the elastic body 72E is low, it slides smoothly with respect to the nozzle surface 14F, and the cleaning liquid penetrates into the high-viscosity ink remaining on the nozzle surface 14F. On the other hand, although a friction coefficient of the wall portion 72W is high, since it has a flexibility, shear deformation is repeated in the front-and-rear direction.

Next, the control part 2 lowers the cap unit 31, and moves the image forming unit 6 between the conveying unit 7 and the cap unit 31. Next, the control part 2 moves the wipe unit 32 forward to wipe the waste liquid containing the ink and the cleaning liquid from the nozzle surface 14F, and then retracts the wipe unit 32 rearward.

Next, the control part 2 moves the image forming unit 6 above the cap unit 31, lifts the cap unit 31 to a height where the wall portion 72W is in contact with the nozzle surface 14F and the elastic body 72E is not in contact with the nozzle surface 14F, and waits until a new image forming job is input.

According to the present modified example, the upper surface of the elastic body 72E is positioned to be lower than the upper end of the wall portion 72W, the wall portion 72W has a size that can surround the entire circumference of the ejectable region 14R where the ejection sports 14A are formed on the nozzle surface 14F, and the control part 2 lifts or lowers at least one of the inkjet head 12 and the cap 72 at a height where the upper end of the wall portion 72W is in contact with the nozzle surface 14F and the elastic body 72E is not in contact with the nozzle surface 14F, and at a height where the upper end of the wall portion 72W and the elastic body 72E are in contact with the nozzle surface 14F. According to the present embodiment, since the ejectable region 14R is surrounded by the wall portion 72W, the nozzle surface 14F is moisturized and the increase in viscosity of the ink in the nozzle 14N is suppressed. Further, as compared with the above embodiment, an opportunity for the elastic body 72E to come into contact with the nozzle surface 14F is reduced, so that deterioration of the nozzle surface 14F is suppressed. Further, it is possible to prevent the scattering of the waste liquid when the elastic body 72E is pressed on the nozzle surface 14F.

The invention claimed is:

1. A maintenance device comprising:
a cap which is attached to a nozzle surface of an inkjet head;
a lifting device which lifts and lowers at least one of the inkjet head or the cap;
a cleaning liquid supply device which supplies a cleaning liquid to the cap,
an oscillating device which oscillates the cap; and
a control part which controls the lifting device, the cleaning liquid supply device and the oscillating device, wherein
the cap has:
a base portion;
a wall portion which protrudes upward from an upper surface of the base portion and surrounds the nozzle surface; and
an elastic body which has a liquid absorbency and is placed on a region inside the wall portion on the base portion, and
the control part controls the cleaning liquid supply device to supply the cleaning liquid to the cap, controls the lifting device such that the elastic body is pressed on the nozzle surface, and then controls the oscillating device to oscillate the cap.

2. The maintenance device according to claim 1, wherein the elastic body is larger than an ejectable region where an ejection port is formed on the nozzle surface and smaller than the nozzle surface.

3. The maintenance device according to claim 1, wherein the control part controls the cleaning liquid supply device such that a liquid height of the cleaning liquid is higher than a height of a bottom surface of the elastic body and lower than a height of the nozzle surface.

4. The maintenance device according to claim 1, wherein the wall portion has a size capable of surrounding an entire circumference of a nozzle plate having the nozzle surface.

5. The maintenance device according to claim 1, wherein
an upper surface of the elastic body is lower than an upper end of the wall portion,
the wall portion has a size capable of surrounding an entire circumference of an ejectable region where an ejection port is formed on the nozzle surface,
the control part controls the lifting device to lift or lower at least one of the inkjet head or the cap to a height at which the upper end of the wall portion comes into contact with the nozzle surface and the elastic body does not come into contact with the nozzle surface and to a height at which the upper end of the wall portion and the elastic body come into contact with the nozzle surface.

6. An inkjet recording apparatus comprising:
the inkjet head, and
the maintenance device according to claim 1.

* * * * *